(12) United States Patent
Sichani et al.

(10) Patent No.: US 7,881,211 B2
(45) Date of Patent: Feb. 1, 2011

(54) LIMITED PERIMETER VECTOR MATCHING FAULT LOCALIZATION PROTOCOL FOR SURVIVABLE ALL-OPTICAL NETWORKS

(75) Inventors: Atousa Vali Sichani, Ottawa (CA); Hussein T. Mouftah, Ottawa (CA)

(73) Assignee: University of Ottawa, Ottawa, Ontario (CA)

( * ) Notice: Subject to any disclaimer, the term of this patent is extended or adjusted under 35 U.S.C. 154(b) by 963 days.

(21) Appl. No.: 11/787,201

(22) Filed: Apr. 13, 2007

(65) Prior Publication Data
US 2007/0280682 A1 Dec. 6, 2007

(30) Foreign Application Priority Data
Apr. 13, 2006 (CA) .................................. 2543417

(51) Int. Cl.
*H04L 12/26* (2006.01)
(52) U.S. Cl. ..................................... 370/248; 370/242
(58) Field of Classification Search ................ 370/216, 370/242, 248, 252, 400
See application file for complete search history.

(56) References Cited

U.S. PATENT DOCUMENTS

| | | | | |
|---|---|---|---|---|
| 4,993,015 A | * | 2/1991 | Fite, Jr. ....................... 370/218 |
| 5,235,599 A | * | 8/1993 | Nishimura et al. ............. 714/4 |
| 5,581,543 A | * | 12/1996 | Natarajan .................... 370/221 |
| 5,636,203 A | * | 6/1997 | Shah .......................... 370/244 |
| 5,835,482 A | * | 11/1998 | Allen .......................... 370/225 |
| 6,163,525 A | * | 12/2000 | Bentall et al. ................. 370/227 |
| 6,282,170 B1 | * | 8/2001 | Bentall et al. ................ 370/225 |
| 6,411,598 B1 | * | 6/2002 | McGlade ..................... 370/217 |
| 6,725,401 B1 | * | 4/2004 | Lindhorst-Ko ................ 714/47 |
| 6,804,712 B1 | * | 10/2004 | Kracht ........................ 709/223 |
| 2001/0038471 A1 | * | 11/2001 | Agrawal et al. .............. 359/110 |
| 2002/0176130 A1 | * | 11/2002 | Maeno ........................ 359/110 |

* cited by examiner

*Primary Examiner*—Brenda Pham
(74) *Attorney, Agent, or Firm*—Ladas & Parry LLP

(57) ABSTRACT

The inventive Limited perimeter Vector Matching fault localization method and system is launched when alarming sinks are identified. Each alarming sink broadcasts its node ID and path length, and all nodes compare their paths to identify an executive sink, which creates an Affected Link Vector consisting of the links in its lightpath, for multicast within a limited perimeter thereabout, the perimeter comprising all nodes within a neighborhood size. Each recipient returns an outcome vector corresponding to the ALV, together with a status, which indicate if the corresponding lightpath is healthy. For failed lightpaths, corresponding cells of the binary vector are set and cleared otherwise. For healthy lightpaths, bits are inverted. The vectors are ANDed by the executive sink to identify the disconnection. The exercise could be repeated for a progressively larger limited perimeter. The affected path is restored by link restoration. Multiple fault localization exercises may be simultaneously performed.

29 Claims, 4 Drawing Sheets

LIMITED PERIMETER VECTOR MATCHING FAULT LOCALIZATION PROTOCOL FOR SURVIVABLE ALL-OPTICAL NETWORKS

CROSS REFERENCE TO RELATED APPLICATIONS

This application claims the benefit of Canadian Patent Application Serial No. 2,543,417, filed Apr. 13, 2006, which disclosure is incorporated herein by reference in its entirety.

FIELD OF THE INVENTION

The present invention relates to methods and systems for fault localization in data networks. More particularly, the present invention relates to fault localization in all-optical networks.

BACKGROUND TO THE INVENTION

Today, optical networks have established themselves as powerful high-bandwidth communication networks. However, their components are still exposed to a variety of service disruptions, including hard and soft failures with long or very short time intervals. Despite the fact that soft and intermittent failures are the most frequent ones in this type of network, hard failures with long disconnection time are the most destructive. In terms of hard failures, cable-cuts are more prevalent than switch-crashes since optical cables are extended widely and subsequently have a higher likelihood of exposure to environmental damages.

In transporting a high volume of data, any severed Wavelength Division Multiplexed (WDM) link can lead to the loss of several terabits per second. Consequently, the network performance can be harshly degraded and the robustness of the network can be shattered. Therefore, maintaining a certain level of network performance, or at least minimizing the effects of link failures, is an important issue that needs to be addressed in the field.

In general, there are two types of dynamic restoration approaches employed to recover the affected networks, link restoration or path restoration cf S. Ramamurthy, L. Sahasrabuddhe, and B. Mukherjee, "Survivable WDM Mesh Networks," *IEEE Journal of Lightwave Technology*, vol. 21, no. 4, pp. 870-883, April 2003. Debates over the pros and cons of these two techniques continue with the cycle of new approaches improving on previous ones. However, the following comparisons highlight some of the drawbacks of methods and systems for fault localization and restoration known in the prior art.

It is commonly understood in the prior art that link restoration is a point-to-point technique, while path restoration is an end-to-end restoration technique. Link restoration restores the affected path with generally less number of links than path restoration. Consequently, link restoration decreases the number of to-be-reconfigured switches and increases the probability of success. In addition, as link restoration maintains a number of working links (segments of path) in place, it preserves the network load balancing, thus avoiding unnecessary "chaos" in the system. However, link restoration can create a congested area around the failed link or cause long restoration loops. While the latter phenomenon could severely alter the protocol functionality of link restoration, typically this only happens in highly loaded networks.

Link restoration is followed by a fault localization interval. The fault localization time for a larger network can be considerable and undesirable. However, at the expense of the fault localization delay, network routing tables are validated and the restoration is completed faster.

In contrast, path restoration implementation does not require any fault localization and is immediately started after a fault alarm is detected. However, path restoration can be time-consuming for distant Source-Destination (S-D) pairs or in heavily loaded networks. This is mostly due to performing rerouting and switching procedures and often repeating these procedures for alternate paths before successfully establishing a restoration path.

In summary, link restoration removes only the failed link capacity by pinpointing the failure location, while path restoration removes the affected path capacity from the network resources by excluding all of the path links.

All-optical networks are designed based on different models and control mechanisms. Optical components are varied in terms of power monitoring or spectrum analysis. Some all-optical components, such as Optical Amplifiers (OA), have limited or no electronic monitoring and analysis abilities. As a result, they may be able to detect loss of signal but cannot define high Bit Error Rate (BER) and/or manage any fault localization procedures. In contrast, there are components capable of detecting failures and able to take proper action in response to service disruptions, for instance Optical Cross-Connects (OXCs).

All-optical networks can be created based on different design topologies such as overlay, augmented, peer-to-peer or integrated. The all-optical WDM network architecture considered herein is the overlay model. In this structural design, optical switches interconnect data links and create the data network, while the control units including electrical/optical/electrical (E/O/E) conversions and optical amplifiers interconnect control links and construct the control data network, also referred to as supervisory channels.

The data network, consisting of the optical switches and data channels, operates in a circuit switching fashion, while the control data network operates in a packet switching way. The traffic in the control data network consists of small control packets resulting in much lighter traffic. Therefore, the control channel is usually implemented by one or more dedicated wavelengths in the same fiber link. When a connection request is arrived, a control packet in the control data network routes and configures switches to create a transparent optical data path, namely a lightpath. Different criteria are considered and various techniques are employed to set up the most resourceful lightpaths cf H. Zang, J. P. Jue, and B. Mukherjee, "A Review of Routing and Wavelength Assignment Approaches for Wavelength-Routed Optical WDM Networks," *SPIE Optical Networks Magazine*, vol. 1, no. 3, pp. 47-60, January 2000.

Unlike Synchronous Optical Network (SONET) networks, which operate point-to-point using the peer model, all-optical transparent networks function end-to-end. As a result, these networks could drop and analyze data only at the end points of established lightpaths (sinks).

Control mechanisms are primarily developed based on either centralized or distributed models. Despite the fact that centralized control mechanisms are relatively simple and work well for static traffic in small networks, they are not considered to be feasible for dynamic expanding systems. In contrast, distributed control mechanisms are complex but more scalable and reliable than the centralized ones. Thus, distributed control models are employed to manage dynamic traffic in large networks. In addition to those models, there are hierarchical models which are a combination of centralized and distributed models.

Hierarchical models are mostly applied to increasingly large networks and dynamic information systems because of their ability to coordinate the network controlling messages. However, hierarchical management models cannot be economically and practically implemented for all network topologies. Subsequently, researchers are still pursuing distributed rather than hierarchical management structures for mesh networks.

The optical layer protection schemes are similar to SONET/SDH (Synchronous Digital Hierarchy) techniques. However, their implementation is substantially different. The optical layer consists of the Optical Channel (OCh) layer also known as the path layer, the Optical Multiplex Section (OMS) layer (line layer), and the Optical Transmission Section (OTS) layer cf R. Ramaswami and K. N. Sivarajan, "Optical Networks: a practical Perspective," Morgan Kaufman, 1998, as shown in FIG. 1 of the prior art.

Nevertheless fault localization can be technically achieved in different layers, for instance in the physical layer through electronic processing and using photodiodes and/or spectrum analyzers.

In SONET, the downstream node attached to the disconnected link detects a failure and reports it to the network management entity. The fault condition then is communicated with the neighbouring nodes to inhibit them from issuing false alarms by management. However, fault localization in SONET involves examining overhead at each node, which slows down the fault localization procedure.

In optical transport networks (long-haul), the fundamental philosophy of the SONET frame has been adopted with a more advanced suitable protocol for high WDM rates, known as digital wrapper cf J. Ballintine, "A Proposal Implementation for a Digital Wrapper for OCh Overhead," ANSI T1X1.5/99-003, January 1999, http://www.t1.org/index/0816. This prior art protocol is able to detect 16 errors and correct 8 errors. Although digital wrapper greatly improves the BER, it also consumes bandwidth by approximately 7% and suffers from related delay.

For all-optical transparent networks, although there are a few prior art papers on fault protection and restoration, there are only a few on fault localization. Introduced fault localization protocols consider different aspects of fault localization such as signalling, alarming, monitoring, detecting, filtering, and also regard various topologies. For instance, in cf A. V. Sichani and H. T. Mouftah, "A Novel Broadcasting Fault Detection Protocol in WDM Networks," *Proceedings of QBSC 2004*, pp. 222-224, May 2004, a fault localization method named broadcasting fault detection protocol is proposed that localizes failures by propagating controlling and localizing signals through the supervisory channels. However, the controlling bandwidth usage is considerable. Rolling back protocol is proposed in A. V. Sichani and H. T. Mouftah, "Rolling Back Signaling Protocol—A Novel Fault Localization Protocol for WDM Mesh Networks," *CIC China Communications Magazine*, vol. 1, no. 1, pp. 101-105, December, 2004 for fast fault localization, which reduces the number of controlling signals in the supervisory channels. While this protocol significantly decreases the traffic in the controlling network but its implementation demands adding more monitoring components to the network.

The work in A. G. Hailemariam, G. Ellinas, and T. Stern, "Localized Failure Restoration in Mesh Optical Networks," *Proceedings of IEEE OFC '04*, pp. 23-27, February 2004 partitions the network into sub-networks called "islands" and discovers a faulty situation that is "a node or link failure" by an island-by-island restoration protocol. Island identification is an off-line procedure, executed during network planning, and occasionally updated when the network topology is changed. It is claimed in P.-H. Ho, J. Tapolcai, T. Cinkler, "Segment Shared Protection in Mesh Communications Networks with Bandwidth Guaranteed Tunnels," *IEEE/ACM Transactions on Networking*, vol. 12, no. 6, pp. 1105-1118. December 2004 that the protocol outperforms segmented restoration protocol in terms of time delay, overhead and complexity.

In order to reduce the number of generated failure alarms, another approach introduced in S. Stanic, S. Subramaniam, H. Choi, G. Sahin, and H. Choi, "On Monitoring Transparent Optical Networks," Proceedings of IEEE ICPPW'02, pp. 218-223, August 2002 optimizes the number of monitoring components using an alarm matrix.

Another research work, H. Zeng, C. Huang and A. Vukovic, "Monitoring Cycles for Fault Detection in Meshed All-optical Networks," *Proceedings of International Conference on Parallel Processing/International Workshop in Optical Networks and Management (ICPP/ONCM '04)*, pp. 434-439, August 2004, proposes a framework for fault detection using a set of monitoring cycles.

A fault location algorithm is proposed in C. Mas and P. Thiran, "An Efficient Algorithm for Locating Soft and Hard Failures in WDM Networks," *IEEE Journal on Selected Areas in Communications*, vol. 18, no. 10, pp. 1900-1911, October 2000, that operates in the physical layer. This protocol is capable of localizing multiple failures and filtering false alarms. However, the time and space complexity of protocol could be considerable for large networks.

A finite state machine method is proposed in C.-S. Li and R. Ramaswami, "Automatic Fault Detection, Isolation, and Recovery in Transparent All-optical Networks," *IEEE Journal of Light wave Technology*, vol. 15, no. 10, pp. 1784-1793, October 1997, but its computational complexity for large-scale and dynamic networks impedes its deployment. There is also a proposal on employing GMPLS for fault detection on all-optical networks, "Generalized Multi-Protocol Label Switching (GMPLS) Architecture," *The Internet Engineering Task Force (IETF)*, RFC 3945, October 2004, http://www-.faqs.org/rfcs/rfc3945.html.

Therefore, in view of the aforementioned prior art, the present invention seeks to provide a highly fast and efficient method and system for fault localization in a data network of nodes through use of a link restoration protocol.

SUMMARY OF THE INVENTION

According to the present invention, the fault localization method and system can be performed on all types of networks. For example, in an all-optical network, fault localization can be accomplished in the optical layer via end-nodes. This is mainly to preserve the high-bandwidth of all-optical communications. At the outset, the present invention assumes that significant factors for having effective fault localization in the optical layer have been properly taken care of. Such factors include: influences due to nonlinearities, dispersion, and wavelength-to-wavelength interactions that are not wrongly reported as an interruption of service; transporting the optical signals from one provider domain to another, and monitoring different signal parameters is done with the same accuracy i.e. interoperability is fully achieved.

In order to provide the maximum level of transparency, the present invention does not necessarily involve any optical power monitoring or spectrum analysis at intermediate nodes. Accordingly, the method of the present invention is activated when a set of alarmingسinks emerges in the system. In a preferred embodiment, the fault localization method of the present invention is implemented by means of several distinct phases: pausing, flooding, multicasting, matching, and concluding phases, not all of which may be used to decrease the computational complexity of localizing the fault.

The method chosen to implement the fault localization makes use of a vector matching system which reduces the procedure to a single logical AND operation to deduce whether a particular link is healthy (represented as a "0" upon completion of the AND operation). Vectors from all sinks are only matched until it is determined that the health of a single remaining link remains undetermined at which point that link is identified as the failed link.

The present invention can also track down simultaneous multi-failure cases.

According to a first broad aspect of the present invention there is disclosed a method for localizing a failure at a link between two nodes in a data network of nodes, wherein data, introduced into the network at a source node, proceeds along a known path comprising a plurality of links, and exits the network at a sink node, the method comprising:
- a) receiving at least one fault alarm associated with at least one alarming sink indicating at least one failed link in its associated path;
- b) designating at least one alarming sink as an executive sink having an associated affected path;
- c) generating a response as to the health of a path associated with at least one other sink and identification of which links in the path associated with the at least one other sink are common to the affected path;
- d) from the response from at least one other sink, identifying as healthy, those links in the path associated with the at least one other sink, which are:
  - i. if the path associated with the at least one other sink does not have a failure, common to the affected path; or
  - ii. if the path associated with the at least one other sink has a failure, not common to the affected path;
- e) repeating step d) for each response from each at least one other sink until only one link in the affected path has not been identified as healthy; and
- f) identifying the remaining link as the failed link.

According to a second broad aspect of the present invention there is disclosed a method for localizing a failure at a link between two nodes in a data network of nodes, wherein data, introduced into the network at a source node, proceeds along a known path comprising a plurality of links, and exits the network at a sink node, the method comprising:
- a) receiving at least one fault alarm associated with at least one alarming sink indicating at least one failed link in its associated path;
- b) designating at least one alarming sink as an executive sink having an associated affected path;
- c) defining a limited perimeter within the network about the executive sink and at least one other sink;
- d) generating a response as to the health of a path associated with the at least one other sink and identification of which links in the path associated with the at least one other sink are common to the affected path;
- e) from the response from at least one other sink, identifying as healthy, those links in the path associated with the at least one other sink, which are:
  - i. if the path associated with the at least one other sink does not have a failure, common to the affected path; or
  - ii. if the path associated with the at least one other sink has a failure, not common to the affected path;
- f) repeating step e) for each response from each at least one other sink until only one link in the affected path has not been identified as healthy; and
- g) identifying the remaining link as the failed link.

According to a third broad aspect of the present invention there is disclosed a method for localizing a failure at a link between two nodes in a data network of nodes, wherein data, introduced into the network at a source node, proceeds along a known path comprising a plurality of links, and exits the network at a sink node, the method comprising:
- a) receiving at least one fault alarm associated with at least one alarming sink indicating at least one failed link in its associated path;
- b) designating at least one alarming sink as an executive sink by choosing the alarming sink with the shortest associated path and designating the associated path as an affected path;
- c) generating a response as to the health of a path associated with the at least one other sink and identification of which links in the path associated with the at least one other sink are common to the affected path;
- d) from the response from at least one other sink, identifying as healthy, those links in the path associated with the at least one other sink, which are:
  - i. if the path associated with the at least one other sink does not have a failure, common to the affected path; or
  - ii. if the path associated with the at least one other sink has a failure, not common to the affected path;
- e) repeating step d) for each response from each at least one other sink until only one link in the affected path has not been identified as healthy; and
- f) identifying the remaining link as the failed link.

According to a fourth broad aspect of the present invention there is disclosed a method for localizing a failure at a link between two nodes in a data network of nodes, wherein data, introduced into the network at a source node, proceeds along a known path comprising a plurality of links, and exits the network at a sink node, the method comprising:
- a) receiving at least one fault alarm associated with at least one alarming sink indicating at least one failed link in its associated path;
- b) designating at least one alarming sink as an executive sink having an associated affected path;
- c) communicating an affected links vector identifying the links in the affected path to the at least one other sink;
- d) generating a recipient vector having:
  - i. a health bit corresponding to the health status of a path associated with the at least one other sink, the health bit reflecting a logical "1" for a healthy status and a logical "0" for a failure status; and
  - ii. a link bit corresponding to each of the links in the affected path, the link bits indicating the presence or absence of a common link in the path associated with the at least one sink; each link bit reflecting, where the status bit reflects a healthy status, a logical "0" for the presence of a common link and a logical "1" for the absence of a common link in the path associated with the at least one sink, and where the status bit reflects a failure status, a logical "1" for the presence of a common link and a logical "0" for the absence of a common link in the path associated with the at least one sink;
- e) from the recipient vector from the at least one other sink, identifying as healthy, those links in the affected path corresponding to a logical "0" in the recipient vector, indicating that:

i. if the path associated with the at least one other sink does not have a failure, the corresponding link is common to the path associated with the at least one other sink; or ii. if the path associated with the at least one other sink has a failure, the corresponding link is not common to the path associated with the at least one other sink;

f) repeating step e) for each recipient vector from each at least one other sink until only one link in the affected path has not been identified as healthy; and g) identifying the remaining link as the failed link.

According to a fifth broad aspect of the present invention there is disclosed a system for localizing a failure at a link between two nodes in a data network of nodes, wherein data, introduced into the network at a source node, proceeds along a known path comprising a plurality of links, and exits the network at a sink node, at least one sink in the network indicating at least one failed link in its associated path and an executive sink chosen from among the at least one sink, the path associated with the executive sink being designated the affected path, the system comprising:

a) at least one other sink other than the executive sink generating a response as to the health of a path associated therewith and identifying which links in its associated path are common to the affected path;

b) a node in the network receiving all of the responses from the at least one other sink and identifying as healthy, those links, in the path associated with the at least one other sink, which are:

i. if the path associated with the at least one other sink does not have a failure, common to the affected path; or ii. if the path associated with the at least one other sink has a failure, not common to the affected path; until there remains only one link in the affected path which has not been identified as healthy and identifying the remaining link as the failed link.

According to a sixth broad aspect of the present invention there is disclosed a sink node, in a data network of nodes and links connecting pairs of nodes, the data network having a failure at a link, the sink node having an associated path comprising a plurality of links for transporting data from a source node where data is introduced into the network to the sink node wherein the data exits the network, the sink node comprising:

a diagnostic monitor for transmitting to a diagnostic node, in response to a request made to at least one sink in the network including the sink node, the health status of the sink node's associated path and the identification of which links in its associated path are common to an affected path associated with an executive node chosen from among those of the at least one sink reporting at least one failed link in its associated path;

whereby the diagnostic node may receive all of the responses from the at least one sink and identify as healthy, those links, in the affected path, which are:

i. if the path associated with the at least one other sink does not have a failure, common thereto; or ii. if the path associated with the at least one other sink has a failure, not common thereto;

until there remains only one link in the affected path which has not been identified as healthy and identifying the remaining link as a failed link.

According to a seventh broad aspect of the present invention there is disclosed a diagnostic node, in a data network of nodes and links connecting pairs of nodes, the data network having a failure at a link, wherein data, introduced into the network at a source node, proceeds along a known path comprising a plurality of links, and exits the network at a sink node, the diagnostic node comprising:

a discriminator for:

identifying from a message from at least one sink, the health status of the at least one sink's associated path and the identification of which links in its associated path are common to an affected path associated with an executive node chosen from among those of the at least one sink reporting at least one failed link in the at least one sink's associated path; and identifying as healthy, those links in the affected path, which are:

i. if the path associated with the at least one other sink does not have a failure, common thereto; or ii. if the path associated with the at least one other sink has a failure, not common thereto;

processing another message in like fashion until there remains only one link in the affected path which has not been identified as healthy and identifying the remaining link as a failed link.

According to a eighth broad aspect of the present invention there is disclosed a computer-readable medium in a sink node, in a data network of nodes and links connecting pairs of nodes, the data network having a failure at a link, the sink node having an associated path comprising a plurality of links for transporting data from a source node where data is introduced into the network to the sink node wherein the data exits the network, the medium having stored thereon, computer-readable and computer-executable instructions which, when executed by a processor, cause the processor to:

transmit to a diagnostic node, in response to a request made to at least one sink in the network including the sink node, the health status of the sink node's associated path and the identification of which links in its associated path are common to an affected path associated with an executive node chosen from among those of the at least one sink reporting at least one failed link its associated path;

whereby the diagnostic node may receive all of the responses from the at least one sink and identify as healthy, those links, in the affected path, which are:

i. if the path associated with the at least one other sink does not have a failure, common thereto; or ii. if the path associated with the at least one other sink has a failure, not common thereto;

processing another message in like fashion until there remains only one link in the affected path which has not been identified as healthy and identifying the remaining link as a failed link.

According to a ninth broad aspect of the present invention there is disclosed a computer-readable medium in a diagnostic node, in a data network of nodes and links connecting pairs of nodes, the data network having a failure at a link, wherein data, introduced into the network at a source node, proceeds along a known path comprising a plurality of links, and exits the network at a sink node, the medium having stored thereon, computer-readable and computer-executable instructions which, when executed by a processor, cause the processor to:

identify from a message from at least one sink, the health status of the at least one sink's associated path and the identification of which links in its associated path are common to an affected path associated with an executive node chosen from among those of the at least one sink reporting at least one failed link in its associated path; and identifying as healthy, those links in the affected path, which are:
  i. if the path associated with the at least one other sink does not have a failure, common thereto; or
  ii. if the path associated with the at least one other sink has a failure, not common thereto;

processing another message in like fashion until there remains only one link in the affected path which has not been identified as healthy and identifying the remaining link as a failed link.

BRIEF DESCRIPTION OF THE DRAWINGS

The embodiments of the present invention will now be described with reference to the following figures, in which identical reference numerals in different figures indicate identical elements and in which.

DETAILED DESCRIPTION OF THE INVENTION

The invention will be described for the purposes of illustration only in connection with certain embodiments. However, it is to be understood that other objects and advantages of the present invention will be made apparent by the following description of the drawings according to the present invention. While a preferred embodiment is disclosed, this is not intended to be limiting. Rather, the general principles set forth herein are considered to be merely illustrative of the scope of the present invention and it is to be further understood that numerous changes may be made without straying from the scope of the present invention.

The present invention provides a protocol, referred to hereinafter as the Limited perimeter Vector Matching fault localization protocol (LVM). It is assumed that each fiber is multiplexed in the applied network. As such, the number of lightpaths traversing a link could be as large as the wavelength multiplexing degree. In general, once such a link fails, the following preferred method may be applied:

A set of sinks detects signal loss or high BER by dropping the data. Since it is assumed that the occurred failure is only detectible by end terminals, for instance at the connected Optical Cross Connects (OXCs) or Optical Add/Drop Multiplexers (OADMs), the closest sink to the failed link could be the first one that discovers the failure. The LVM protocol is thus launched in reaction to reports from alarming sinks.

Alarming sinks are recognized as potential executive sinks whose path from the data source will form the basis of the LVM protocol. If an OXC drops the data of more than one lightpath passing through the failed link, then the shortest lightpath is chosen as the associated path to that potential executive sink.

The potential executive sink pauses for a pre-determined period of time to allow the entire network nodes to reach their steady states. The pausing interval can be very short and is defined based on the network characteristics, including the diameter and the average propagation delay on hops.

Figure 1:
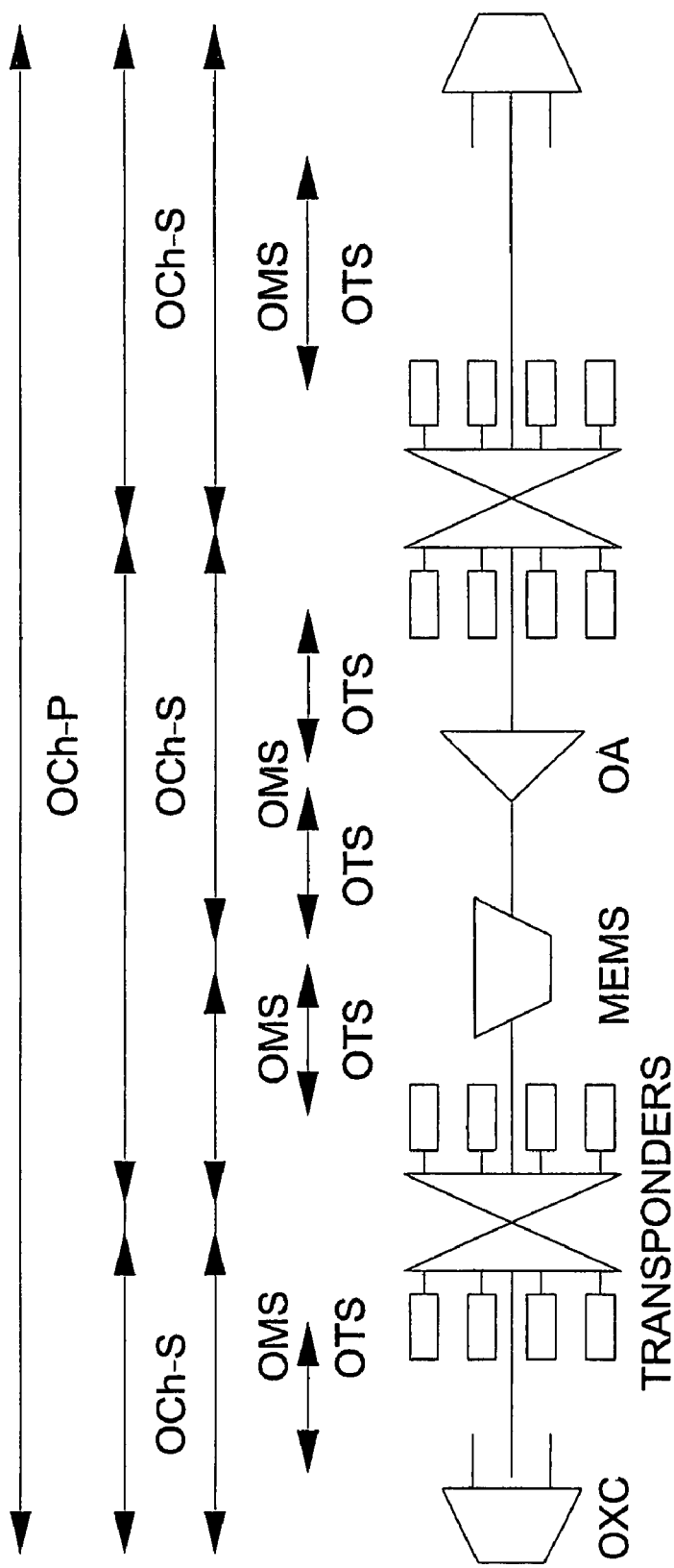
FIG. 1 illustrates the OTS, OMS, and OCh sublayers of the optical layer known in the prior art.
Figure 2:
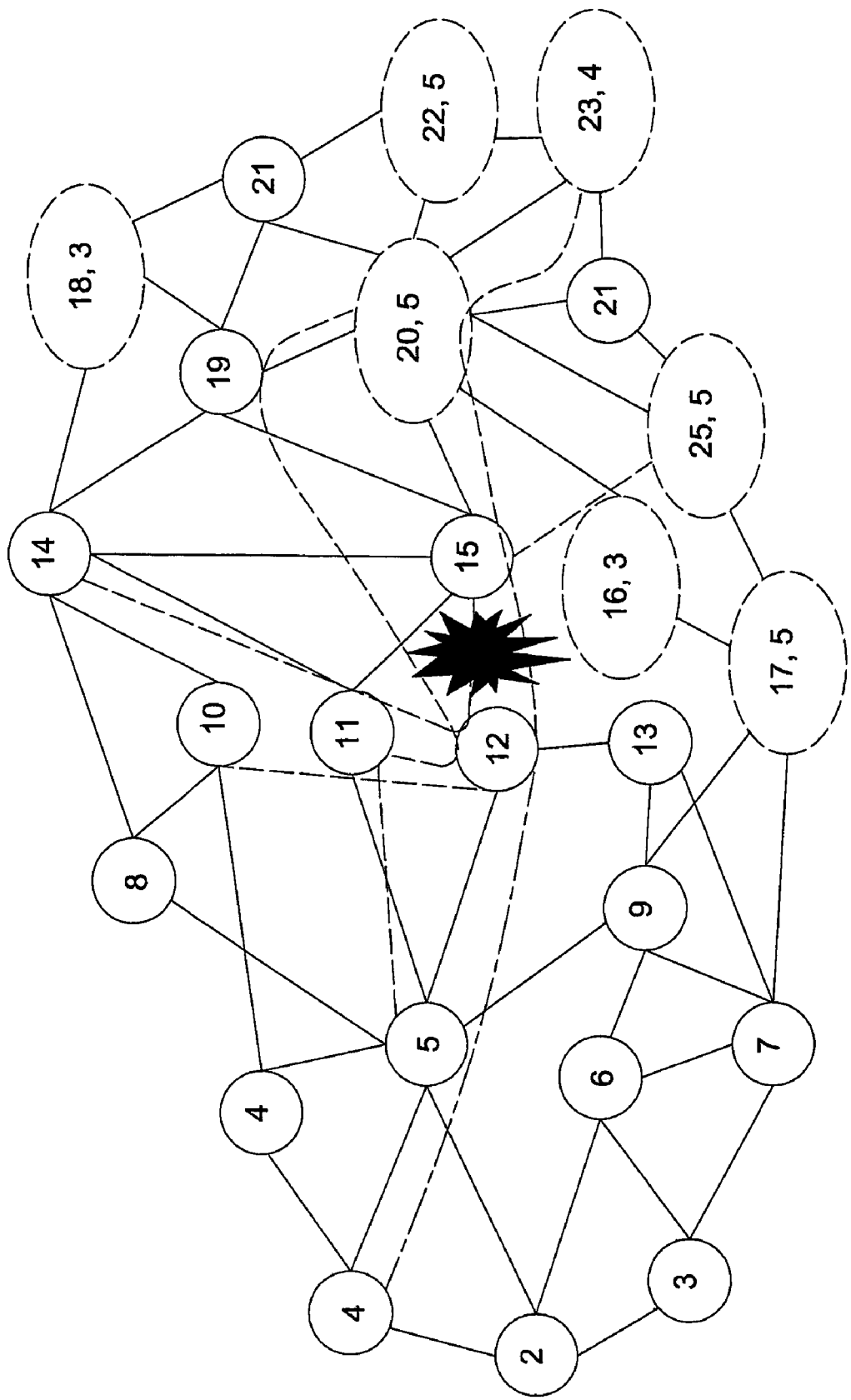
FIG. 2 illustrates sinks competing for selection as the executive sink in accordance with an exemplary embodiment of the present invention.

Potential executive sinks thereafter report their status to the network nodes by flooding an associated alarming signal. The alarm encapsulates the node identification (ID) and also the path length. Accordingly, potential executive sinks receive information from other potential executive sinks. FIG. 2 shows a group of potential executive sinks labeled according to their ID and associated path lengths.

Recipients of these status messages then compare their paths with those of other recipients. If a sink's path length is the smallest among others, as an exemplary criterion, it recognizes that it can act as the executive sink and conduct fault localization. If there are several sinks with equal path lengths, the recipients will apply a secondary criterion to identify the executive sink, for example, by comparing IDs. In such a case, a sink with the smallest ID is selected as the executive sink among sinks with equal path lengths. Those having ordinary skill in this art will readily recognize that in most cases the choice of the primary selection criterion may have an impact on the efficiency of the LVM protocol, but such secondary criteria may have a much less or even negligible performance impact. To insure a successful completion of this process of executive sink selection, a pausing period is imposed after the selection of the executive sink. This pausing period is defined based on the propagation delay over the longest lightpath disrupted by this failure.

In a next step, the selected executive sink creates a vector consisting of the links in its associated lightpath, designated as the affected lightpath. The vector is referred to hereinafter as the Affected-Link-Vector (ALV). Meanwhile, the executive sink also defines a limited perimeter, which comprises all neighboring nodes to a certain neighborhood size, of all nodes in the affected lightpath from the data source to the selected executive sink.

Figure 3:
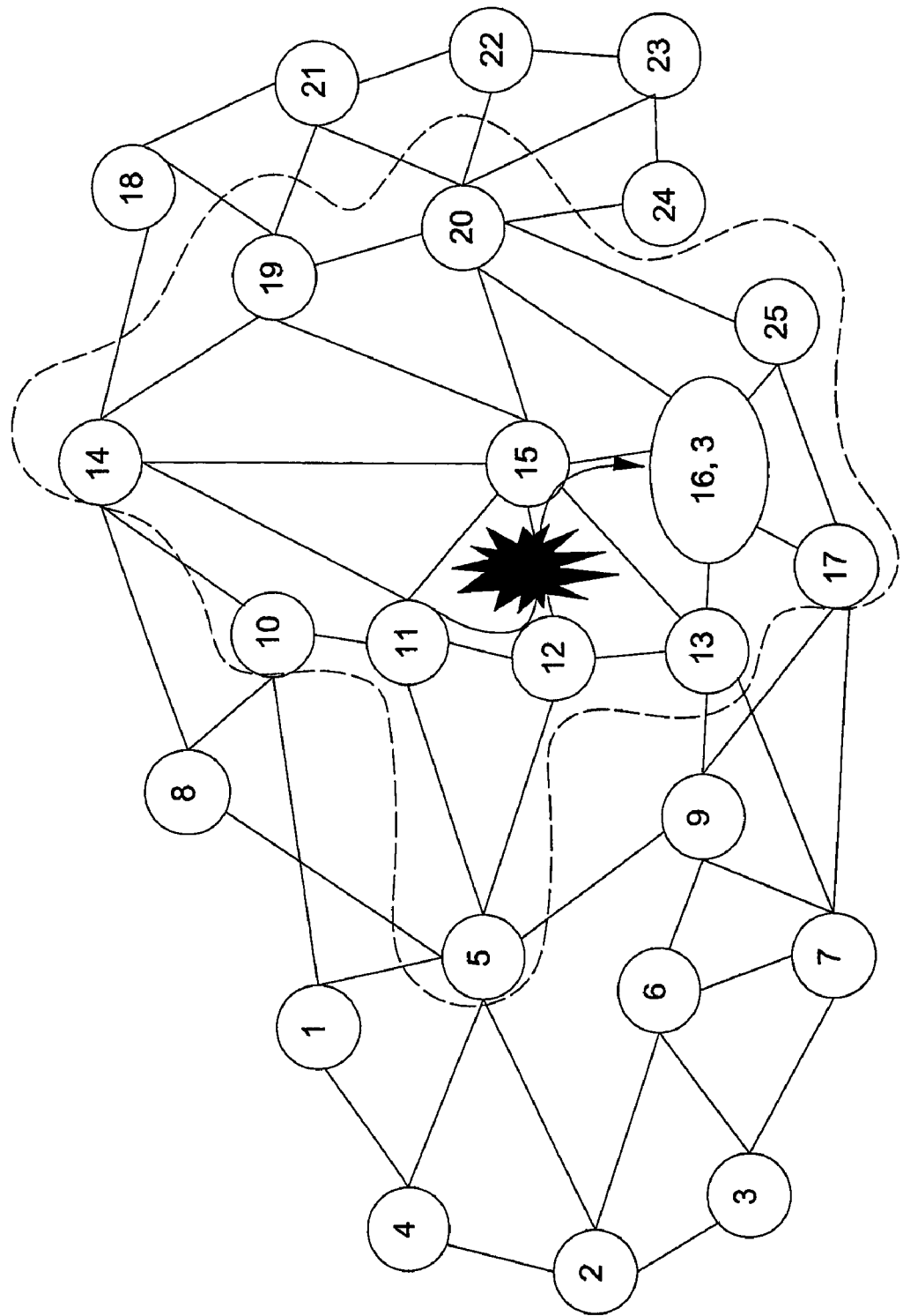
FIG. 3 illustrates a limited perimeter being defined relative to the designated affected path P4 in accordance with the embodiment of FIG. 2 and using a neighbourhood size of 1.

Thus, the smaller the size of the lightpath from the data source to the executive sink, the smaller the neighborhood and the more efficient the performance of the LVM protocol. It is for this reason that preferably, the primary selection criterion for the executive sink is the brevity of the associated lightpath from the data source. FIG. 3 illustrates the ALV path and the associated limited perimeter, with a neighborhood size of 1.

The executive sink then multicasts a copy of the ALV vector to all nodes within the limited perimeter along the control network. Receipt of the ALV vector suppresses the recipients from taking further steps as potential executive sinks. In this embodiment, the suppressing action is acted only upon the nodes within the defined limited perimeter. Consequently, those potential executive sinks, which have not received an ALV, may have an opportunity to run a second LVM exercise, if there is a multiplicity of errors. Therefore again, a short lightpath for the executive sink primary criterion is advantageous in that it encourages multiple errors localization. Nevertheless, to avoid having either coincident LVM exercises for a single failure or inefficient fault localization, a second LVM exercise should be performed after checking the result of the first LVM exercise.

In some rare cases, the executive sink may deliver the ALV vector to the perimeter nodes, because the failed link is selected as the root link of the multicast tree. To overcome this problem, a limited broadcast is used. The broadcast can be limited by using the number of hops as a time to live (TTL) variable. The TTL value depends on the number of links of the executive lightpath. For example, TTL is equal to the number of links in the executive path plus 1. TTL can be incremented each time the protocol fails to locate the failed link.

According to the first LVM exercise, each ALV recipient creates its own link-vector and compares it with the ALV vector. The outcome of element matching is demonstrated by means of a binary vector corresponding to the ALV vector returned over the control network to the executive sink together with a recipient status. If the corresponding lightpath is healthy (working), a status of "1" is returned, for a failed (non-functional) lightpath, a status of "0" is returned.

For a failed lightpath, the corresponding cell of the binary vector is set to "1" if the same link is found in the recipient link-vector. In contrast, the corresponding cell of the binary vector is set to "0" if the examined link does not match with any elements of the recipient link-vector.

For a healthy lightpath, bits are inverted in order to show analogous conditions.

The executive sink collects the returned binary vectors from all nodes within the limited perimeter. It performs a logical AND operation on each of the received binary vectors to define the disconnection as follows: a "0" indicates that the corresponding link is healthy. A "1" conveys no information about the health of the link.

The rules for setting bits in the binary vector are inverted as between a failed and a healthy status in order to satisfy this rule.

By vector matching successive binary vectors, eventually the health of only one link in the affected lightpath will remain in doubt and this link will be determined to be the failed link.

If the executive sink could not define the disconnection in this stage (if there remains more than one set bit in the binary vector), it could launch a second round of search by extending the limited perimeter to a further edge. For instance, the limited perimeter could expand over the neighbors of the considered nodes, that is, to a neighborhood size of 2.

The executive sink broadcasts the location of the failure. Then, network nodes update their network routing tables to facilitate ongoing restoration procedures and guarantee upcoming connections to be securely routed through working links.

In the last step, a link restoration protocol, well known in the art, for example, the generalized loop-back protocol of M. Medard, S. G. Finn, and R. A. Barry, "WDM Loop-back Recovery in Mesh Networks," *Proceedings of IEEE INFO-COM*, vol. 2, pp. 752-759, March 1999; and M. Medard, S. G. Finn, R. A. Barry, W. He and S. S. Lumetta, "Generalized Loop-back Recovery in Optical Mesh Networks," *IEEE Transactions on Networking*, vol. 10, no. 1, pp. 153-164, February 2002, is implemented to restore the affected paths.

The present invention provides a fault localization protocol applicable to all-optical networks, as well as other types of networks. The proposed protocol, Limited perimeter Vector Matching fault localization protocol (LVM), is highly efficient due to operation in the OCh layer.

From the foregoing, it can be seen that the protocol implementation can be preferably summarized as having five steps. First, after detection of a fault condition the system is paused to reach a steady-state condition. Second, the sink associated with the shortest affected path is identified as the executive sink to conduct the fault localization protocol. Third, based on the executive sink path links, a limited perimeter of a predetermined neighbourhood size is defined. The executive sink path information is disseminated in the form of an Affected-Link-Vector to each node within the limited perimeter. Fourth, each recipient compares its own link-vector with the ALV and sends the matching results via a binary vector generally corresponding to the fields of the ALV back to the executive sink. Fifth, the executive sink, by performing a logical AND operation on the binary vectors progressively rules out links in the affected lightpath as being healthy and resolves to identify the failed link.

However, those having ordinary skill in this art will recognize that one or more of these steps alone or executed in various sub-combinations will still provide efficiencies in fault localization within a network. For example, the vector matching operation may introduce efficiencies even if no executive sink is identified (but rather a different node multicasts the ALV and receives and processes responses), if a sink with a longer lightpath is identified; or if no perimeter is chosen, so that the ALV is broadcast to all nodes in the network. However, these cases could increase computational complexity and delay.

In terms of time and space complexities, the analytical results suggest that the time and space complexities are much less than those of counterpart protocols. The performance difference is amplified as the network is extended to a larger one in terms of diameter and/or propagation delay between neighbouring nodes. These outcomes can be logically predicted from the LVM protocol, which dynamically defines and limits the fault localization area. In addition to providing lower complexity and cost in single failure situations, the protocol is also able to locate multiple failures occurring in non-overlapping limited perimeters. Thus, the LVM is a powerful fault localization method with remarkable advantages for survivable networks, whether or not in the optical domain.

All-optical networks are typically used as transportation networks for other networks, including SONET, IP, and ATM. The former networks are in possession of fault localization protocols, which mainly work through monitoring and analyzing overhead bits and accordingly, are much more time-consuming methods. If a simultaneous multi-failure case happens within a limited-perimeter that perplexes the inventive LVM protocol, upper layer fault localization schemes will support this optical layer scheme. However, simultaneous multiple failures (tandem failures with zero interval time between them) are very rare.

By way of example, the present invention is applied to a mesh network. For the sake of simplicity it is assumed that only a few lightpaths have been established in the network. It is understood that increasing the number of lightpaths will accelerate the matching process since additional binary vectors are supplemented. Each link is defined herein by its two end nodes. In this example, it is assumed that link {12-15} is disconnected while the established lightpaths in the network are:

P1={5-11-12-15-19-20},
P2={10-11-12-15-16-25},
P3={3-6-9-13-16},
P4={11-12-15-16},
P5={14-11-12-13},
P6={14-11-12-15-16-17},
P7={4-5-12-15-20-25},
P8={5-12-15-20-24-23},
P9={17-25-24-23}, and
P10={12-15-19-18}.

Accordingly, it may be seen that the disconnection affects several paths, including P1, P2, P4, P6, P7, P8, and P10. Since path P4 has the shortest length (and also the smallest ID), it will be designated the affected lightpath and sink 16 is designated among all potential executive sinks, as the executive sink. Thus, the executive sink specifies the limited perimeter which comprises all the neighboring nodes (in a neighboring size of 1) of the affected lightpath, that is, nodes [5, 10, 11, 12, 13, 14, 15, 16, 17, 19, 20, 25].

FIG. 3 further illustrates the executive sink and the associated limited perimeter for the example described below. In this example, only paths within the defined limited perimeter are involved in the fault localization procedure. The ALV vector of the executive sink is formed and disseminated to each of the limited perimeter nodes. All nodes within the limited perimeter receive a copy of the ALV vector, showing the affected lightpath, that is P4, as follows:

| 11-12 | 12-15 | 15-16 | ALV |
|---|---|---|---|

It is assumed that the recipients respond in order roughly corresponding to their proximity to the executive sink. Therefore, sink 17 is likely the first recipient to produce its own recipient link vector showing the lightpath terminating in sink 17, that is P6 and match its elements with the ALV vector.

As discussed previously, if the sink 17 is the sink for more than one lightpath, the analysis is performed on the shortest path. The intention is to reduce the fault localization computational complexity and delay by decreasing the length of processing jobs.

In fact, each sink could send more than one binary vector, if the processing delay is in the accepted delay range. However, there is more information in shorter paths than in longer ones for failed paths. Shorter paths are more likely to be exclusive of ALV links and thus insert "0" in their binary vectors. For healthy paths, on the other hand, longer paths are more helpful. However, since the objective is to have low latency and complexity, the healthy paths also check their shortest paths.

| 14-11 | 11-12 | 12-15 | 15-16 | 16-17 |
|---|---|---|---|---|

The matching vector of sink 17 is tailored by setting the corresponding cells of a binary vector equivalent to the ALV. The path status is also attached to complete the basic information about the recipient.

The rules for setting bits in the binary vector are as follows:

If the lightpath under consideration is healthy, the status bit is set to "1" and all links common to the lightpath under consideration and the affected lightpath are set to "0". All other links are set to "1". If the lightpath is a failure, the status bit is set to "0" and the common link bits are set to "1" and all other link bits are set to "0".

Those having ordinary skill in the art will readily recognize that the two sets of rules could be rationalized by applying an XOR and XNOR logical operation on the link bits based on the accompanying status bit. As well, similar operations could be implemented with equivalent efficiency, but with different bit-setting rules.

The resulting vector is sent back to the executive sink by sink 17. The associated binary vector has been labelled by the corresponding ALV links for descriptive purposes. In practice, only a binary vector having one bit more than the number of links in the lightpath associated with the executive sink (ALV) (in this case 4-bits) is sent back to the executive sink.

The path will have failed because of its dependence upon the defective link {15-16}. The "0" in the status bit indicates the failure of the path. The "1" in the first 3 fields of the binary vector show that each of these links is present in path P6.

| 11-12 | 12-15 | 15-16 | Status |
|---|---|---|---|
| 1 | 1 | 1 | 0 |

In this example, receiving this vector does not have any positive effect on the ALV binary vector because each of the links in the ALV vector are shared with the vector for sink 17 and as such, no common healthy link can be determined. This is shown by the return of all "1s".

Next, sink 13 generates its own recipient link-vector corresponding to lightpath P5 and compares it with the ALV vector. Although this path has not been affected by the failure, it should reply to the executive sink as sink 13 lies within the limited perimeter.

| 14-11 | 11-12 | 12-13 |
|---|---|---|

As this path is in a working state, the status bit is set to "1" and an inverted orientation of bits is represented in the associated binary vector. That is, the bit corresponding to link {11-12} is cleared to indicate a common link. The other bits corresponding to links {12-15} and {15-16} are set to "1" to indicate that they are not present in the path P6.

As discussed below, an inverse orientation of bits is used to simplify the fault localization process.

| 11-12 | 12-15 | 15-16 | Status |
|---|---|---|---|
| 0 | 1 | 1 | 1 |

From this, it may be therefore deduced that link {11-12} is healthy because it shows a "0". This is understandable as it is the only common link and the status of the lightpath under study was healthy.

When the executive sink receives this vector corresponding to path P5, ANDing it with the binary vector corresponding to path P6 results in the following vector.

| 11-12 | 12-15 | 15-16 | ALV |
|---|---|---|---|
| 0 | 1 | 1 | X |

Next, sink 25 generates its recipient link-vector corresponding to lightpath P2 and compares it with the ALV vector.

| 10-11 | 11-12 | 12-15 | 15-16 | 16-25 |
|---|---|---|---|---|

As a result, its common links and status are reported back to the executive sink. As this path failed, the status returned is "0", and the bits corresponding to the links of the path P4 to the executive sink are inverted, so that a "1" signifies a common link.

| 11-12 | 12-15 | 15-16 | Status |
|---|---|---|---|
| 1 | 1 | 1 | 0 |

Upon receipt, ANDing this vector with the two previously received binary vectors (corresponding to paths P6 and P5) does not have any diagnostic effect because the bits in binary vector P2 are all "1". This too is understandable because all three links are in the lightpath and the failure status demonstrates that one of them failed.

Sink 20 generates its recipient link-vector, corresponding to lightpath P1, to discover the common terms with ALV.

| 5-11 | 11-12 | 12-15 | 15-19 | 19-20 |
|---|---|---|---|---|

Because it contains link {12-15} it will return a failure status. Thus, a "1" in the link bit denotes a common link. Thus, the following binary vector is disseminated to the executive sink. The "0" in link bit {15-16} demonstrates it to be healthy. This is understandable because it is not a common link with the affected lightpath and there was a failure status returned.

| 11-12 | 12-15 | 15-16 | Status |
|---|---|---|---|
| 1 | 1 | 0 | 0 |

ANDing this binary vector with the previously received binary vector(s) demonstrates that the link {12-15} is the only one not yet determined to be healthy. It is identified as the failed link.

| 11-12 | 12-15 | 15-16 | ALV |
|---|---|---|---|
| 0 | 1 | 0 | X |

Although the executive sink is still receiving binary vectors from other sinks, such as P7 and P10, it is able to discover the failed link {12-15} at this stage because it has identified link {15-16} as being healthy and it had previously identified link {11-12} as being healthy as shown above.

Those having ordinary skill in this art will readily recognize that instead of performing the logical AND operation pair-wise between each binary vector, a logical AND between each binary vector in a single operation will maintain the integrity of the health information thus obtained.

Therefore, implementations that are time conscious might decide to perform the logical AND operation on successive returned binary vectors until the health of a single link remains undetermined, at which point any remaining binary vectors are discarded and the remaining link is chosen as a failure link.

On the other hand, if simplicity is more preferable, the executive sink could wait until all binary vectors are received and all of them together then identify the failed link.

Finally, the executive sink broadcasts the failed link information to the network nodes.

With respect to protocol performance, the present invention can be evaluated in terms of time and space complexities. To simplify the calculations, the fault localization protocol is analyzed in terms of the following discrete phases:

I. The pausing phase
II. The flooding phase
III. The multicasting phase
IV. The matching phase
V. The concluding phase In Phase I, the network nodes pause to reach their steady-state conditions. The related pausing period determined by the average distance between S-D pairs, i.e. $E[d_{sd}]$ and the expected value of propagation delays between neighbouring nodes, i.e. $\alpha$.

$$T_1 = E[d_{sd}]\alpha. \qquad (1)$$

During Phase II, potential executive sinks flood their information through the network. In this phase, the sink with the shortest path and ID wins the competition and conducts the LVM fault localization procedures. The associated flooding time interval is given by, $$T_2 = D\alpha. \qquad (2)$$

where D stands for the network diameter based on the number of hops.

The delay in the multicasting phase (Phase III) is also related to $E[d_{sd}]$ since the maximum path lengths within the limited perimeter comprise at most two additional hops to the shortest path. Therefore, the associated delay equals:

$$T_3 = (E[d_{sd}]+2)\alpha. \qquad (3)$$

The order of computational complexity of matching two vectors with lengths $L_1$ and $L_2$ (Phase IV) is $O(L_1 L_2)$. Therefore, the computational complexity of comparing each two vectors in the matching phase is on the order of $O(d_{s_1 d_1} d_{s_2 d_2})$. Thus, the computational complexity on average is on the order of $O(E[d_{sd}]^2)$. If it is assumed that all recipients perform this process concurrently, the related delay for phase IV is proportional to the computational complexity as follows, $$T_4 = E[d_{sd}]^2 \beta. \qquad (4)$$

where $\beta$ represents the computational time cycle. Finally, Phase V could be completed in a single time cycle, $\beta$.

Therefore, the overall delay for the defined phases is calculated as follows:

$$T_{LVM} = \sum_{i=1}^{5} T_i = E[d_{sd}]\alpha + D\alpha + (E[d_{sd}]+2)\alpha + E[d_{sd}]^2\beta + \beta. \qquad (5)$$

The time complexity is calculated based on a matrix-formed mesh network with M+1 by N+1 nodes. The distance between any S-D pairs could be presented as follows.

$$d_{sd} = |x_s - s_d| + |y_s - y_d|. \qquad (6)$$

where $(x_s, y_s)$ and $(x_d, y_d)$ are the x-y coordinates of the source and destination. It is assumed that the coordinates of source and destination are independent and also x and y coordinates of each are independent uniform random variables with the following distributions:

$$P(x_s = m) = P(x_d = n) = \frac{1}{M+1}, \forall m, n = 0, 1, \ldots, M, \qquad (7)$$

$$P(y_s = p) = P(y_d = q) = \frac{1}{N+1}, \forall p, q = 0, 1, \ldots, M.$$

Then, the expected value of the distance is given by, $$E[d_{sd}] = E[|x_s - x_d|] + E[|y_s - y_d|]. \qquad (8)$$

In order to calculate the average distance we use the distribution of $|x_s - x_d|$ and $|y_s - y_d|$ respectively, as follows, $$P(|x_s - x_d| = i) = \sum_k P(x_s = k)P(x_d = i - k) \quad (9)$$

$$P(|y_s - y_d| = j) = \sum_k P(y_s = k)P(y_d = j - k),$$

where k in the above summations takes all possible values. It follows that:

$$P(|x_s - x_d| = i) = \frac{2(M + 1 - i)}{M(M + 1)} \quad \forall i = 1, \ldots, M, \quad (10)$$

$$P(|y_s - y_d| = j) = \frac{2(N + 1 - j)}{N(N + 1)} \quad \forall j = 1, \ldots, N.$$

Therefore, it is shown that, $$E[|x_s - x_d|] = \sum_{i=0}^{M} i\left(\frac{2(M + 1 - i)}{M(M + 1)}\right) = \frac{M + 2}{3}. \quad (11)$$

Similarly, it is shown that, $$E[|y_s - y_d|] = \frac{N + 2}{3}. \quad (12)$$

Thus, the expected value of distance is defined based on M and N as follows, $$E[d_{sd}] = \frac{M + N + 4}{3}, \quad (13)$$

Now that the expected value of the distance between S-D pairs is calculated, the time complexity based on M and N is presented as:

$$T_{LVM} = \sum_{i=1}^{5} T_i = (M + N)\alpha + \left(\frac{M + N + 7}{3}\right)2\alpha + \left(\frac{M + N + 4}{3}\right)^2 \beta + \beta. \quad (14)$$

If it is assumed that $\beta \geq \alpha$, the calculated delay is mainly related to the quadratic term. However, $\alpha$ for some networks could be larger than $\beta$. Then, we investigate the effect of varying these variables on $T_{LVM}$ to find the dominant term. To reduce the number of variables, it is assumed that M=N and $\beta$=1. $\alpha$ varies based on N, i.e. $\alpha$=N,2N, . . . .

Figure 4:
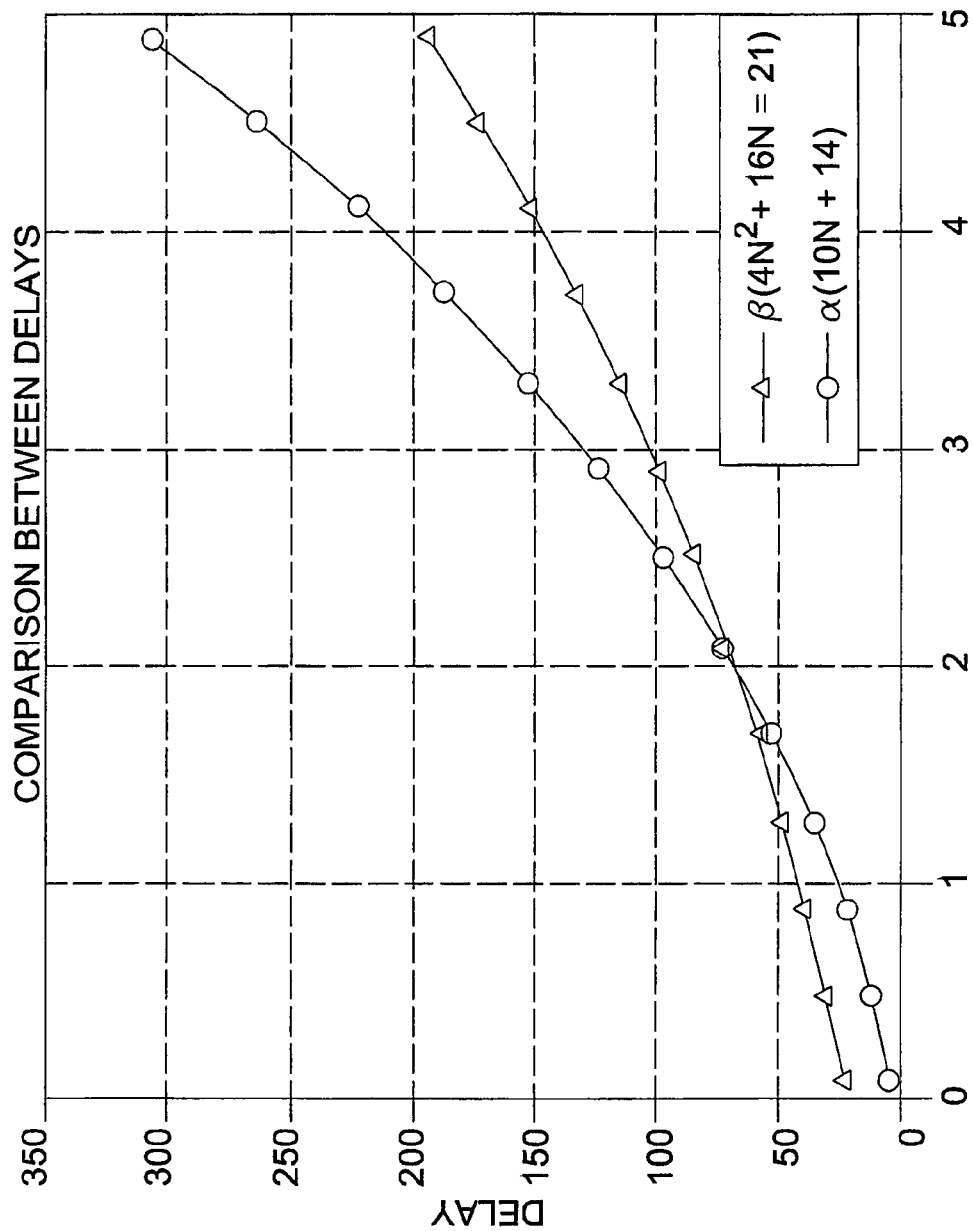
FIG. 4 is a graphical representation illustrating an exemplary comparison between the propagation and computational delays in accordance with an embodiment of the present invention.

FIG. 4 illustrates the results of the comparison. The drawing curves reveal that when $\alpha$=M+N=2N both terms have the equal effect on the delay (note that for an example matrix of M=N=5, $\alpha$ is calculated to be 10 when $\beta$ is set to 1) but as $\alpha$ increases, its related delay becomes dominant.

Alternatively, the space complexity can be calculated by defining the following phases:

I. The Multicasting Phase

In the first multicasting phase, nodes within the defined limited perimeter received a copy of the ALV. Assuming that m bits represent each link:

$$S_1 = mE[d_{sd}]. \quad (15)$$

II. The Matching Phase

In the matching phase, the executive sink receives matching vectors with the ALV length from n recipients.

Then, $$S_2 = nE[d_{sd}]. \quad (16)$$

Therefore, the space complexity would be equal to $$S_{LVM} = (m + n)E[d_{sd}] \quad (17)$$

$$S_{LVM} = (m + n)\frac{M + N + 4}{3}.$$

For comparison, a similar distributed protocol that does not impose any restriction on the searching area is considered. Similar to VLM processes, a lower bound on the time complexity is calculated as follows:

$$T_X = (M + N)3\alpha + \left(\frac{M + N + 4}{3}\right)^2 \beta + \beta. \quad (18)$$

Relatively, the space complexity would be, $$S_X = (m + M + N)\left(\frac{M + N + 4}{3}\right). \quad (19)$$

Comparing this result with that of the LVM protocol demonstrates the advantages of the present invention in accelerating the fault localization process and saving memory units.

$$T_X - T_{LVM} = \left(\frac{4(M + N) - 14}{3}\right)\alpha, \quad (20)$$

$$S_X - S_{LVM} = (M + N - n)\left(\frac{M + N + 4}{3}\right). \quad (21)$$

In addition to the proven enhancements, LVM is able to localize multi-failure. Multi-failure detection and localization is possible if the defined limited perimeters are separated, i.e., the rule is set out that no link is shared between limited perimeters. The existence of a second executive sink is generally discovered only after the multicasting phase of the first executive sink. While possibly having concurrent multiple executives in the system may create multi-running LVMs for a single failure or cause inefficiency, to eliminate the problem, a second LVM could be performed after checking the result of the first LVM. Thus, multiple failures could be consecutively identified with only a short interval between them. Since the time difference between two tandem failures pragmatically is not zero, it can be concluded that LVM can quickly and effectively respond to multi-failure cases.

It should be understood that the preferred embodiments mentioned here are merely illustrative of the present invention. Numerous variations in design and use of the present invention may be contemplated in view of the following claims without straying from the intended scope and field of the invention herein disclosed.

The present invention can be implemented in digital electronic circuitry, or in computer hardware, firmware, software, or in combination thereof. Apparatus of the invention can be implemented in a computer program product tangibly embodied in a machine-readable storage device for execution by a programmable processor; and methods actions can be performed by a programmable processor executing a program of instructions to perform functions of the invention by operating on input data and generating output. The invention can be implemented advantageously in one or more computer programs that are executable on a programmable system including at least one input device, and at least one output device. Each computer program can be implemented in a high-level procedural or object oriented programming language, or in assembly or machine language if desired; and in any case, the language can be a compiled or interpreted language.

Suitable processors include, by way of example, both general and specific microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of nonvolatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in ASICs (application-specific integrated circuits).

Examples of such types of computers are programmable processing systems contained in the sinks.

It will be apparent to those skilled in this art that various modifications and variations may be made to the embodiments disclosed herein, consistent with the present invention, without departing from the spirit and scope of the present invention.

Accordingly, the specification and the embodiments are to be considered exemplary only, with a true scope and spirit of the invention being disclosed by the following claims.

Having thus described the invention, the embodiments for which an exclusive privilege or property is claimed are:

1. A method implemented using a computer for localizing a failure at a link between two nodes in a data network of nodes, wherein data, introduced into the network at a source node, proceeds along a known path comprising a plurality of links, and exits the network at a sink node, the method comprising:
   a) receiving at least one fault alarm associated with at least one alarming sink indicating at least one failed link in its associated path;
   b) designating at least one alarming sink as an executive sink having an associated affected path;
   c) generating a response as to the health of a path associated with at least one other sink and identification of which links in the path associated with the at least one other sink are common to the affected path;
   d) from the response from at least one other sink, identifying as healthy, those links, in the path associated with the at least one other sink, which are:
      i. if the path associated with the at least one other sink does not have a failure, common to the affected path; or
      ii. if the path associated with the at least one other sink has a failure, not common to the affected path;
   e) repeating step d) for each response from each at least one other sink until only one link in the affected path has not been identified as healthy; and
   f) identifying the remaining link as the failed link.

2. The method as claimed in claim 1, further comprising, as step g), broadcasting the identity of the failed link to the network.

3. The method as claimed in claim 2, wherein step g) further comprises updating a network routing table to facilitate network restoration.

4. The method as claimed in claim 1, wherein the step of designating the executive sink comprises choosing the at least one alarming sink having the shortest associated path.

5. The method as claimed in claim 1, wherein the step of generating a response comprises communicating the links in the affected path to the at least one other sink.

6. The method as claimed in claim 5, wherein the step of communicating the links comprises transmitting an affected link vector identifying the links in the affected path.

7. The method as claimed in claim 6, wherein the affected link vector is transmitted by the executive sink.

8. The method as claimed in claim 6, wherein the step of generating a response comprises populating a recipient vector with entries corresponding to each link in the affected path and indicating the presence or absence of a common link in the path associated with the at least one sink and an entry indicating the status of the path associated with the at least one sink.

9. The method as claimed in claim 8, wherein the recipient vector entries comprise data bits.

10. The method as claimed in claim 9, wherein the data bits corresponding to the status reflect a logical "1" for a healthy status and a logical "0" for a failure status.

11. The method as claimed in claim 10, wherein the data bits corresponding to the links in the affected path reflect, if the status bit reflects a healthy status, a logical "0" for the presence of a common link and a logical "1" for the absence of a common link in the path associated with the at least one sink.

12. The method as claimed in claim 10, wherein the data bits corresponding to the links in the affected path reflect, if the status bit reflects a failure status, a logical "1" for the presence of a common link and a logical "0" for the absence of a common link in the path associated with the at least one sink.

13. The method as claimed in claim 11, wherein a logical "0" in a data bit corresponding to the links in the affected path identifies the corresponding link as healthy.

14. The method as claimed in claim 11, wherein the step of identifying a link as healthy comprises performing a logical AND operation on a recipient vector with at least one other recipient vector.

15. The method as claimed in claim 11, wherein steps d) and e) comprise performing a logical AND operation on all received recipient vectors and identifying as a failure a single remaining data bit with a logical "1".

16. The method as claimed in claim 4, further comprising the step of defining a limited perimeter within the network about the executive sink and at least one other sink.

17. The method as claimed in claim 16, wherein the step of defining a limited perimeter comprises identifying those nodes in the network within a predetermined number of links from a node of the affected path.

18. The method as claimed in claim 17, wherein the predetermined number is 1.

19. The method as claimed in claim 16, further comprising, if there remains more than one link in the affected path that have not been identified as healthy after processing each response from each at least one other sink, broadening the limited perimeter to include more nodes and repeating steps c) through f).

20. The method as claimed in claim 1, wherein step a) further comprises pausing after detection of the alarm condition to enable the network to reach a steady-state condition.

21. The method as claimed in claim 4, wherein the step of designating an executive sink comprises choosing from between at least two alarming sinks, each of which has the same associated path length according to a differentiating trait of the at least two alarming sinks.

22. The method as claimed in claim 21, wherein the differentiating trait is an identifier of the at least two alarming sinks.

23. The method as claimed in claim 1, wherein the step of generating responses from each at least one other sink comprises transmitting the responses to the executive sink.

24. The method as claimed in claim 16, wherein all of the at least one alarming sinks associated with a second failure at a link lie outside the defined perimeter, and comprising localizing the second failure by applying steps b) through e) of the method to the at least one alarming sinks associated with the second failure.

25. A method implemented using a computer for localizing a failure at a link between two nodes in a data network of nodes, wherein data, introduced into the network at a source node, proceeds along a known path comprising a plurality of links, and exits the network at a sink node, the method comprising:
   a) receiving at least one fault alarm associated with at least one alarming sink indicating at least one failed link in its associated path;
   b) designating at least one alarming sink as an executive sink having an associated affected path;
   c) defining a limited perimeter within the network about the executive sink and at least one other sink;
   d) generating a response as to the health of a path associated with the at least one other sink and identification of which links in the path associated with the at least one other sink are common to the affected path;
   e) from the response from at least one other sink, identifying as healthy, those links, in the path associated with the at least one other sink, which are:
      i. if the path associated with the at least one other sink does not have a failure, common to the affected path; or
      ii. if the path associated with the at least one other sink has a failure, not common to the affected path;
   f) repeating step e) for each response from each at least one other sink until only one link in the affected path has not been identified as healthy; and
   g) identifying the remaining link as the failed link.

26. A method implemented using a computer for localizing a failure at a link between two nodes in a data network of nodes, wherein data, introduced into the network at a source node, proceeds along a known path comprising a plurality of links, and exits the network at a sink node, the method comprising:
   a) receiving at least one fault alarm associated with at least one alarming sink indicating at least one failed link in its associated path;
   b) designating at least one alarming sink as an executive sink by choosing the alarming sink with the shortest associated path and designating the associated path as an affected path;
   c) generating a response as to the health of a path associated with the at least one other sink and identification of which links in the path associated with the at least one other sink are common to the affected path;
   d) from the response from at least one other sink, identifying as healthy, those links in the path associated with the at least one other sink, which are:
      i. if the path associated with the at least one other sink does not have a failure, common to the affected path; or
      ii. if the path associated with the at least one other sink has a failure, not common to the affected path;
   e) repeating step d) for each response from each at least one other sink until only one link in the affected path has not been identified as healthy; and
   f) identifying the remaining link as the failed link.

27. A method implemented using a computer for localizing a failure at a link between two nodes in a data network of nodes, wherein data, introduced into the network at a source node, proceeds along a known path comprising a plurality of links, and exits the network at a sink node, the method comprising:
   a) receiving at least one fault alarm associated with at least one alarming sink indicating at least one failed link in its associated path;
   b) designating at least one alarming sink as an executive sink having an associated affected path;
   c) communicating an affected links vector identifying the links in the affected path to the at least one other sink;
   d) generating a recipient vector having:
      i. a health bit corresponding to the health status of a path associated with the at least one other sink, the health bit reflecting a logical "1" for a healthy status and a logical "0" for a failure status; and
      ii. a link bit corresponding to each of the links in the affected path, the link bits indicating the presence or absence of a common link in the path associated with the at least one sink; each link bit reflecting, where the status bit reflects a healthy status, a logical "0" for the presence of a common link and a logical "1" for the absence of a common link in the path associated with the at least one sink, and where the status bit reflects a failure status, a logical "1" for the presence of a common link and a logical "0" for the absence of a common link in the path associated with the at least one sink;
   e) from the recipient vector from the at least one other sink, identifying as healthy, those links in the affected path corresponding to a logical "0" in the recipient vector, indicating that:
      i. if the path associated with the at least one other sink does not have a failure, the corresponding link is common to the path associated with the at least one other sink; or
      ii. if the path associated with the at least one other sink has a failure, the corresponding link is not common to the path associated with the at least one other sink;
   f) repeating step e) for each recipient vector from each at least one other sink until only one link in the affected path has not been identified as healthy; and
   g) identifying the remaining link as the failed link.

28. The method as claimed in claim 1 wherein the method is performed on an all-optical network.

29. A system for localizing a failure at a link between two nodes in a data network of nodes, wherein data, introduced into the network at a source node, proceeds along a known path comprising a plurality of links, and exits the network at a sink node, at least one sink in the network indicating at least one failed link in its associated path and an executive sink chosen from among the at least one sink, the path associated with the executive sink being designated the affected path, the system comprising:
- a) at least one other sink other than the executive sink generating a response as to the health of a path associated therewith and identifying which links in its associated path are common to the affected path;
- b) a node in the network receiving all of the responses from the at least one other sink and identifying as healthy, those links, in the path associated with the at least one other sink, which are:
  - i. if the path associated with the at least one other sink does not have a failure, common to the affected path; or
  - ii. if the path associated with the at least one other sink has a failure, not common to the affected path;

until there remains only one link in the affected path which has not been identified as healthy and identifying the remaining link as the failed link.

* * * * *